United States Patent
Holt et al.

(10) Patent No.: US 6,747,541 B1
(45) Date of Patent: Jun. 8, 2004

(54) SPOOL ASSEMBLY WITH INTEGRATED LINK-WIRE AND ELECTRICAL TERMINALS FOR NON-EXPLOSIVE ACTUATORS USED IN ELECTRO-MECHANICAL STRUCTURAL SEPARATION DEVICES

(75) Inventors: Andrew Holt, Camarillo, CA (US); Jui-Yu Wu, Irvine, CA (US); Matthew Dalton, Moorpark, CA (US); Patrick Laughlin, Thousand Oaks, CA (US)

(73) Assignee: G&H Technology, Inc., Camarillo, CA (US)

( * ) Notice: Subject to any disclaimer, the term of this patent is extended or adjusted under 35 U.S.C. 154(b) by 0 days.

(21) Appl. No.: 10/313,573

(22) Filed: Dec. 6, 2002

(51) Int. Cl.⁷ .................... G05G 17/00; A62C 37/04
(52) U.S. Cl. ................. 337/401; 337/1; 337/5; 337/140; 74/2; 403/2; 403/28
(58) Field of Search ................. 337/1–5, 140, 337/401–403, 159, 160, 231, 273, 279, 280–282, 291, 296, 412, 416; 74/2; 403/2, 28

(56) References Cited

U.S. PATENT DOCUMENTS

| | | | |
|---|---|---|---|
| 3,359,804 A | * 12/1967 | Phillips | ............................. 74/2 |
| 3,695,116 A | 10/1972 | Baur | |
| 3,863,720 A | * 2/1975 | Young | ........................... 169/59 |
| 3,924,688 A | 12/1975 | Cooper | |
| 4,906,962 A | 3/1990 | Duimstra | |
| 5,438,173 A | 8/1995 | Rudoy | |
| 5,471,888 A | 12/1995 | McCormick | |
| 5,606,889 A | * 3/1997 | Bielinski et al. | .................. 74/2 |
| 5,621,373 A | 4/1997 | McCormick | |
| 5,748,066 A | 5/1998 | Holt | |
| 6,133,818 A | 10/2000 | Hsieh | |
| 6,433,990 B1 | 8/2002 | Rudoy | |
| 6,525,920 B2 | * 2/2003 | Rudoy et al. | ................ 361/160 |
| 2002/0080547 A1 | 6/2002 | Rudoy | |
| 2003/0076215 A1 | * 4/2003 | Baghdasarian | .............. 337/401 |

* cited by examiner

Primary Examiner—Anatoly Vortman
(74) Attorney, Agent, or Firm—Thomas I. Rozsa; Tony D. Chen

(57) ABSTRACT

An improved spool assembly for non-explosive actuators used in electro-mechanical structural separation devices. The spool assembly includes two spool halves each having external surfaces and a generally flat internal surface, a unitary and integral internal member made of an electrically conductive material and having a link-wire portion and two electrical terminal portions, and an external wrap-wire wound around the two spool halves and having a connecting end connected to the link-wire portion of the unitary and integral internal member such that the wrap-wire tightly binds the two spool halves together to form a spool for retaining an external structural member. When an electrical current of a sufficient magnitude is applied through the electrical terminal portions of the unitary and integral internal member, the link-wire portion of the unitary and integral internal member will be heated, which reduces its tensile strength to a magnitude below a tensile stress exerted thereon by the connecting end of the wrap-wire, causing the link-wire portion of the unitary and integral internal member to be broken, which in turn causes the wrap-wire to be loosened, allowing the two spool halves to separate apart which permits displacement of the external structural member.

25 Claims, 4 Drawing Sheets

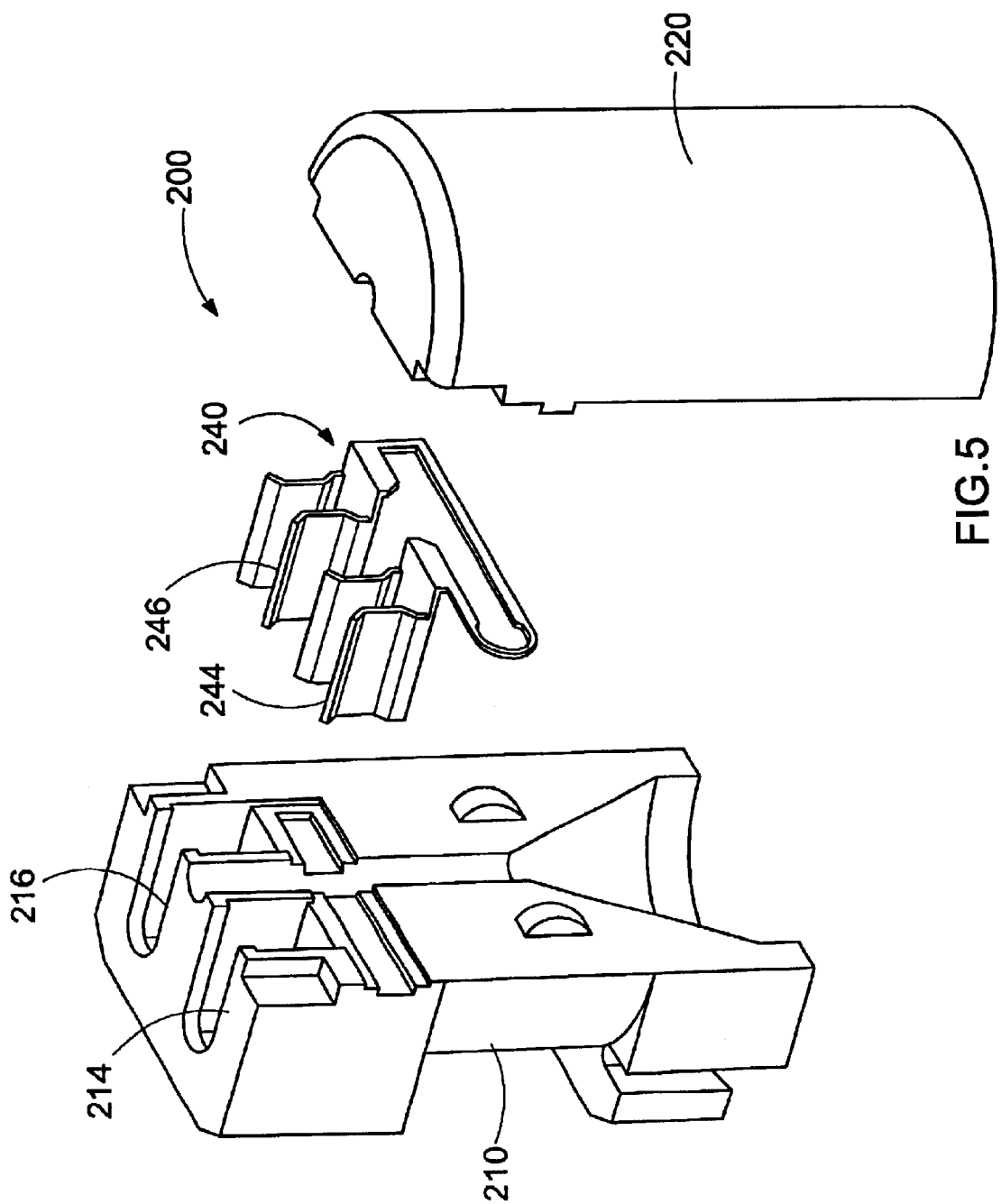

SPOOL ASSEMBLY WITH INTEGRATED LINK-WIRE AND ELECTRICAL TERMINALS FOR NON-EXPLOSIVE ACTUATORS USED IN ELECTRO-MECHANICAL STRUCTURAL SEPARATION DEVICES

BACKGROUND OF THE INVENTION

1. Field of the Invention

The present invention generally relates to the field of mechanical structural separation devices used in aerospace, manufacturing and construction industries, and more particularly relates to internal structure and designs of non-explosive actuators used in electro-mechanical structural separation devices for initiating structural separation processes.

2. Description of the Prior Art

Electro-mechanical structural separation devices are widely used in the aerospace, manufacturing and construction industries. The purpose of utilizing separation devices is to provide a quick and reliable release of an external attached structural load without damaging the external structure of the load carrier. Preferably, the release mechanism is designed to be used in a repeatable manner.

The following ten (10) prior art patents are found to be pertinent to the field of the present invention:

1. U.S. Pat. No. 3,695,116 issued to Baur on Oct. 3, 1972 for "Non-Explosive Electrically Initiated Heat-Ignitable Actuator" (hereafter the "Baur Patent");
2. U.S. Pat. No. 3,924,688 issued to Cooper on Dec. 9, 1975 for "Fire Fighting System" (hereafter the "Cooper Patent");
3. U.S. Pat. No. 4,906,962 issued to Duimstra on Mar. 6, 1990 for "Fuse Wire Switch" (hereafter the "Duimstra Patent");
4. U.S. Pat. No. 5,438,173 issued to Rudoy on Aug. 1, 1995 for "Cell Bypass Switch" (hereafter the "First Rudoy Patent");
5. U.S. Pat. No. 5,471,888 issued to McCormick on Dec. 5, 1995 for "Motion Initiator" (hereafter the "First McCormick Patent");
6. U.S. Pat. No. 5,621,373 issued to McCormick on Apr. 15, 1997 for "Non-Explosive Initiator with Link Wire Assembly" (hereafter the "Second McCormick Patent");
7. U.S. Pat. No. 5,748,066 issued to Holt on May 5, 1998 for "Cartridge Motion Initiator with Replaceable Link Wire Controller" (hereafter the "Holt Patent");
8. U.S. Pat. No. 6,133,818 issued to Hsieh on Oct. 17, 2000 for "Redundant Fuse Wire Release Device" (hereafter the "Hsieh Patent");
9. U.S. Pat. Publication No. U.S. 2002/0080547 A1 on an application by Rudoy on Jun. 27, 2002 for "Electrically and Mechanically Redundant Release Mechanism" (hereafter the "Rudoy Application"); and
10. U.S. Pat. No. 6,433, 990 B1 issued to Rudoy on Aug. 13, 2002 for "Frangible Actuator with Redundant Power Supply" (hereafter the "Second Rudoy Patent").

The Baur Patent discloses a non-explosive, electrically initiated, heat-ignitable actuator constructed and arranged in the form of a biased, collapsible dual piston assembly. When the actuator is in the unactuated condition, the dual piston assembly is prevented from collapsing by an electrically triggerable dual shear pin and associated heat-ignitable wire arrangement. The shear pins and their associated wires are composed of a primarily aluminum and palladium bimetallic composition which when ignited produces a violent but non-explosive reaction which rapidly propagates to all portions of the material. The construction of the dual piston assembly is such that ignition of either or both of the shear pins causes the piston assembly to collapse and thereby bring about actuation of the actuator.

The Cooper Patent discloses a fire control system having a plurality of hot wire electro-mechanical activators for non-explosive initiation of a corresponding plurality of fire extinguishers. The activators may be connected either in parallel for increased reliability or in series for increased ease in testing for continuity. Each activator has a split collet formed of two spool halves with a restraining wire wrapped around it having a hook at one end attached to a hot wire which is connected to electrical leads mounted on one of the spool halves. A shaft contacts the split collet in such a manner so as to cause the spool halves to separate when not restrained by the restraining wire. Displacement of the shaft is obtained by applying an actuation current to the leads which reduces the tensile stress applied by the restraining wire. When the hot wire fails in tension, the restraining wire is released to thereby permit the spool halves to separate to permit the shaft to be displaced by an internal spring or external force. The shaft is connected either directly to a utilization device such as a fire extinguisher for displacement thereof in a direction parallel to the centerline of the shaft or through a cylinder having fingers for displacement at an angle to the centerline of the shaft.

The Duimstra Patent discloses a spring powered switching mechanism in which the energy required to complete switching is stored in a spring (or springs) which are constrained in a "cocked" or stressed condition by a fuse wire. The fuse wire has the characteristic of having a relative flat coefficient of resistivity over a large temperature range. The mechanism is operative to close (or open) electrical circuits permanently upon receipt of the appropriate electrical signal to the "fuse" or "bridge" wire which is caused to break as a result of the receipt of the electrical signal.

The First Rudoy Patent discloses a cell bypass switch particularly designed for aerospace applications. The cell bypass switch can sense a battery cell failure and automatically opens an alternate path around the failed cell, bypassing the failure and allowing the remainder of the battery system to continue its function. The cell bypass switch is designed to be placed in parallel with the battery cell it protects. The present invention includes two electro-mechanical actuator assemblies which are mounted on the top end of the housing for respectively operating two plungers. Each of the electro-mechanical actuator assembly includes two spool halves which are held together by a tight winding of a restraining wire that terminates in a bridge wire connecting two electrical terminals of the electro-mechanical actuator. Each spool, by virtue of the restraining wire winding, can restrain a spring loaded plunger. However, when sufficient electrical current is passed through the terminals and the bridge wire, the bridge wire will heat up and break under the applied tension load. This causes the restraining wire to unwind, separating the spool halves and releasing the plunger.

The First McCormick Patent discloses an electrical initiator which includes spool halves releasably held together by a coiled retaining wire. A link wire also holds a spool fixed to one spool half against a connector body and the other spool half. A cavity on the interior of the two spools physically retain a tensilely loaded shaft. An electric current passing through the link wire causes it to become brittle and break releasing the spool halves and contained shaft.

The Second McCormick Patent discloses a link wire arrangement for use in a non-explosive initiator which includes a link wire received within a pair of tubes, each tube having its outer end formed into a loop and its opposite end crimped to physically and electrically secure the tubes to the included link wire. The tubes are encapsulated within an insulating body.

The Holt Patent discloses a controller which is provided to selectively release an initiator having first and second members that clampingly engage an object preventing it from moving in an urged direction. A spring wire coil holds the members tightly about the object, one coil end affixed to one of the members and the other coil end is held by a pair of link wire loops of the controller which is also removably secured to one of the controllers which is also removably secured to one of the members by a bolt. When it is desired to release the object, an electric current of sufficient magnitude is passed through the link wire loops to cause the loops to break releasing the coil to unwind and, in turn, release the object for urged movement.

The Hsieh Patent discloses a highly reliable release apparatus which is used to stow or release desired devices such as, for example, solar arrays, antenna positioning mechanisms, reflectors found on satellites, space stations or spacecraft. Deployment of the desired device is prevented or allowed by respectively restraining or releasing a first member under tension. The apparatus comprises a support member having an opening and a first face arranged about the opening. A second member is located within the opening when the first member is in tension and is adapted to be attached to an end of the first member. At least three locking members such as fuse wires are arranged on the first face of said support member for restraining the second member within the opening in order to maintain tension on the first member. The second member is attached to the first member in a manner such that at least two of the fuse wires must be severed before the restraint on the second member is released. A system is provided for actuating the release apparatus by selectively severing at least two of the locking members when deployment of the device is desired.

The Rudoy Application discloses an electrically and mechanically redundant release mechanism that uses two fuse wires to hold an insulator hub in place which, in turn, retains a hook-shaped release end of a restraining wire. The insulator hub is provided with two grooves, one for each fuse wire, and with a center hole midway between the grooves. A lanyard is terminated at its ends by a pair of loops. The loop is secured through a center hole in the insulator hub. The fuse wires are connected to two power supplies which are employed as a redundant power supply or fusible link decoupling device. A restraining wire is wrapped around and holds together a pair of spool halves of a frangible actuator. A release pin has a head portion, which is captured between the spool halves, and a shaft portion. As a load exerts a force upon the release pin, it tends to move it away from a frangible actuator. Current from either of the power supplies can cause a failure of its connected fuse wire which, upon failure, releases the insulator hub from being held in place and release of the hub in turn frees the restraining wire end and permits the spool halves to separate under exertion of the load. Should one power supply fail for any reason, current will also flow from the other power supply through its connecting wire to cause a failure of its fuse wire. Additional fuse wires may be parallelly added to the fuse wires to preclude premature separation of restraining wire from the hub.

The Second Rudoy Patent discloses a device for restraining and then quickly releasing objects, comprising two half-spools that are held in place by a coil spring. The spring is attached at one end to one of the spools and at another end is held in place by a frangible wire, which is in turn connected to redundant power supplies. Insulation is provided by coating a base portion with aluminum oxide and attaching an insulator hub to the end of the spring held by the frangible wire. Cut-outs within the coils are provided to maximize separation force.

While many of the above cited references have described various separation mechanisms that utilize expandable spools bound by retaining wires that can be released by the breakage of a link wire, it appears that no cited reference has focused on the design and construction of the link wire and its connection with the two electrical terminals, or the way and manner such electrical terminals and link wire are mechanically held in place between the two spool halves.

Referring to FIG. 1, there is shown at 10 an example of a typical prior art non-explosive actuator (NEA), as seen in the Cooper Patent. It includes two spool halves 11 and 12 bounded by a wrap-wire 17 for retaining an external structural member 19 between the two spool halves 11 and 12. The wrap-wire 17 applies a circumferential stress to the spool halves 11 and 12 and has a bent end portion 18 which is hooked to a loop of a link-wire 13. The link-wire is connected to two electrical terminals 14 and 16.

When an actuating current of sufficient magnitude is applied to the terminals 14 and 16, the link-wire 13 will be heated, which reduces the tensile strength of the link-wire 13 to a magnitude below the tensile stress exerted on the link-wire 13 by the wrap-wire 17 at its bent end portion 18, to thereby causes the link-wire 13 to be broken. This in turn causes the wrap-wire 17 to be loosened and the circumferential stress applied by the wrap-wire 17 on the spool halves 11 and 12 to be reduced, allowing the spool halves to separate apart which permits the displacement of the external structural member 19.

It is desirable to provide a new and improved design and construction of the internal structural components of the spool assembly of the NEAs used in electro-mechanical structural separation devices that increases the durability and reliability of repeatable operation of the NEAs, shortens the assembling and production process of the spool assemblies, and reduces material and manufacturing costs of the NEAs.

SUMMARY OF THE INVENTION

The present invention is an improved spool assembly with integrated link-wire and electrical terminals for non-explosive actuators (NEAs) used in electro-mechanical structural separation devices.

It is an object of the present invention to provide an improved spool assembly for NEAs used in electro-mechanical structural separation devices, where the spool assembly is of a simple structure yet offers all functions required for the NEA operation.

It is also an object of the present invention to provide an improved spool assembly for NEAs used in electro-mechanical structural separation devices, where the spool assembly includes an internal structural member that integrate the link-wire and electrical terminals into one unitary piece.

It is another object of the present invention to provide an improved spool assembly for NEAs used in electro-mechanical structural separation devices, where the spool assembly includes two spool halves that hold the integrated link-wire and electrical terminal piece in place when the two spool halves are bound together by a wrap wire.

It is an additional object of the present invention to provide an improved spool assembly for NEAs used in electro-mechanical structural separation devices, where the electrical terminals integrated with the link-wire have electrically conducive surfaces exposed outside of the two spool halves bound together by the wrap wire for contact connection with external electrical connectors.

It is a further object of the present invention to provide an improved spool assembly for NEAs used in electro-mechanical structural separation devices, where the electrical terminals integrated with the link-wire have electrically conductive sockets accessible from outside of the two spool halves bound together by the wrap wire for plug-in connection with external electrical connectors.

Described generally, the present invention is an improved spool assembly for NEAs used in electro-mechanical structural separation devices. The improved spool assembly includes two spool halves each having external surfaces and a generally flat internal surface, a unitary and integral internal member made of an electrically conductive material and having a link-wire portion and two electrical terminal portions, and an external wrap-wire wound around the two spool halves and having a connecting end connected to the link-wire portion of the unitary and integral internal member such that the wrap-wire tightly binds the two spool halves together to form a spool for retaining an external structural member.

The internal surface of at least one of the two spool halves has recesses that generally match a configuration of the unitary and integral internal member for receiving the unitary and integral internal member such that when the two spool halves are bound by the wrap-wire, the unitary and integral internal member is securely held in place therebetween without causing a gap between the internal surfaces of the two spool halves.

In addition, the two electrical terminal portions of the unitary and integral internal member each has a contact end exposed and accessible from outside of the two spool halves when they are bound by the wrap-wire for providing electrical terminal contacts.

When an electrical current of a sufficient magnitude is applied through the electrical terminal contacts, the link-wire portion of the unitary and integral internal member will be heated, which reduces its tensile strength to a magnitude below a tensile stress exerted thereon by the connecting end of the wrap-wire, causing the link-wire portion of the unitary and integral internal member to be broken, which in turn causes the wrap-wire to be loosened, allowing the two spool halves to separate apart which permits displacement of the external structural member.

The present invention improved spool assembly for NEAs used in electro-mechanical structural separation devices has many unique features and advantages. It increases the durability and reliability of repeatable operation of the NEAs. It also shortens the assembling and production process of the spool assemblies. It further reduces material and manufacturing costs of the NEAs.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 5 is an exploded perspective view of another one of the preferred embodiments of the present invention improved spool assembly for an NEA used in electro-mechanical structural separation devices.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
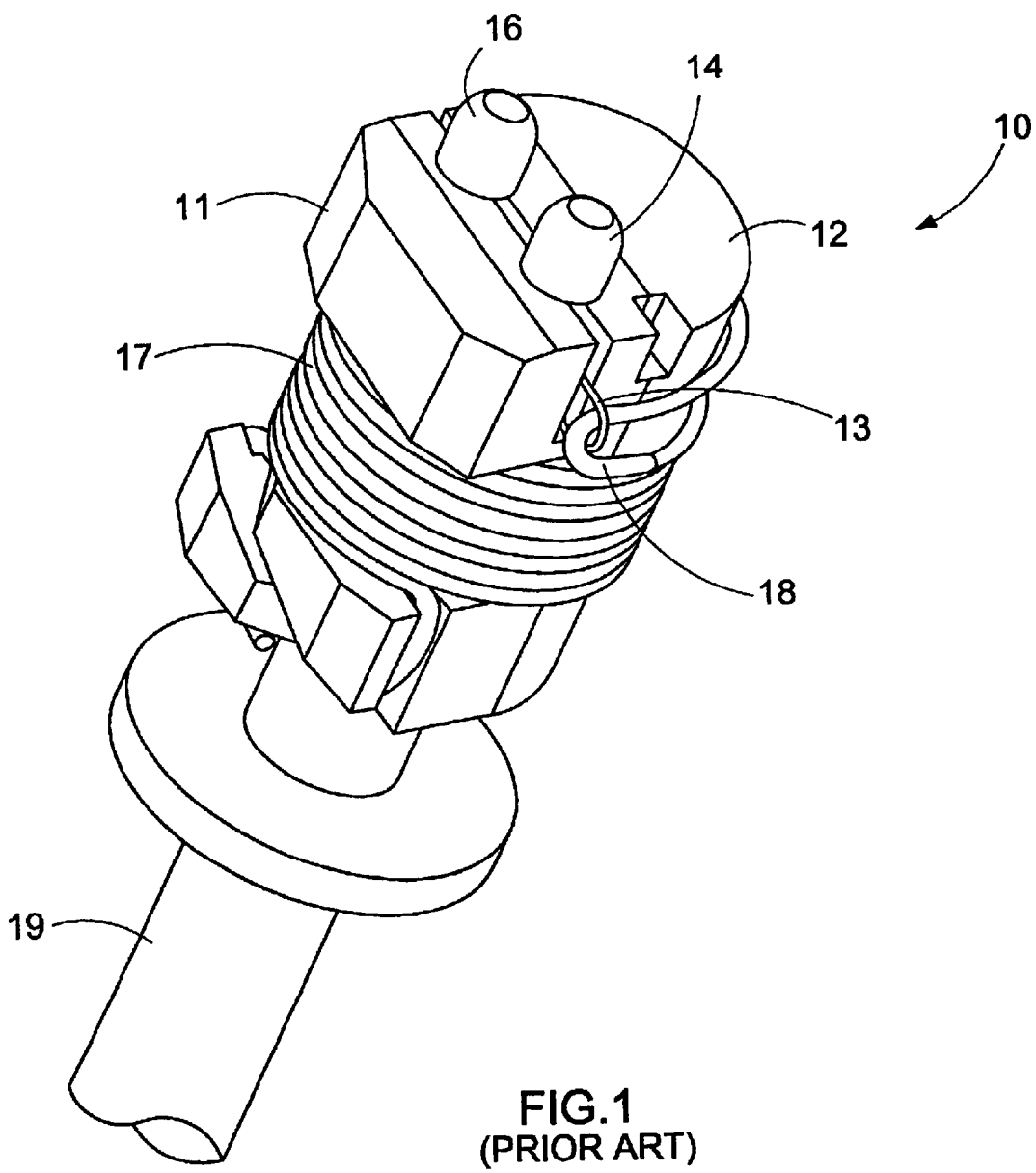
FIG. 1 is a perspective view of a prior art non-explosive actuator (NEA) used in electro-mechanical structural separation devices.
Figure 2:
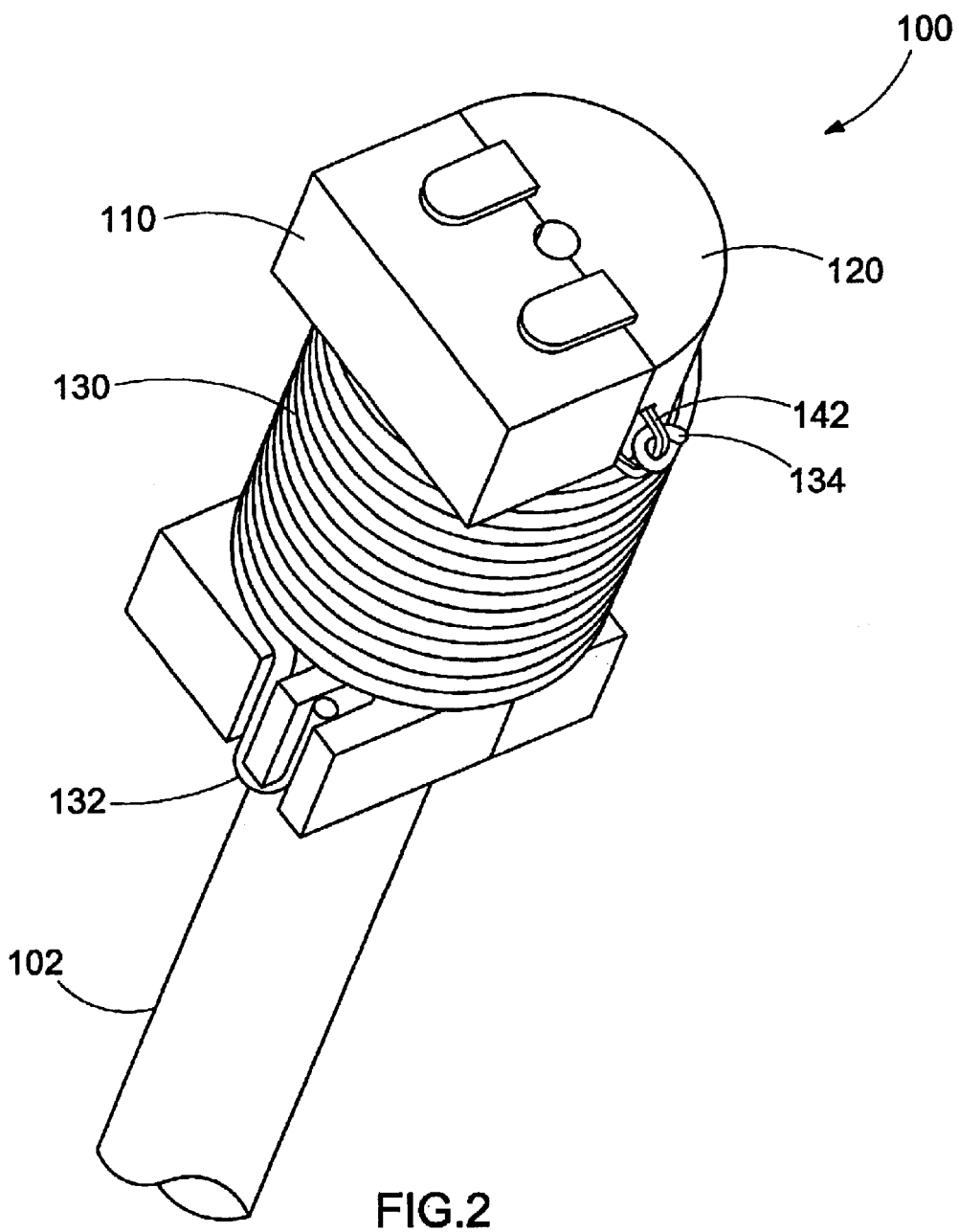
FIG. 2 is a perspective view of one of the preferred embodiments of the present invention improved spool assembly for an NEA used in electro-mechanical structural separation devices.
Figure 3:
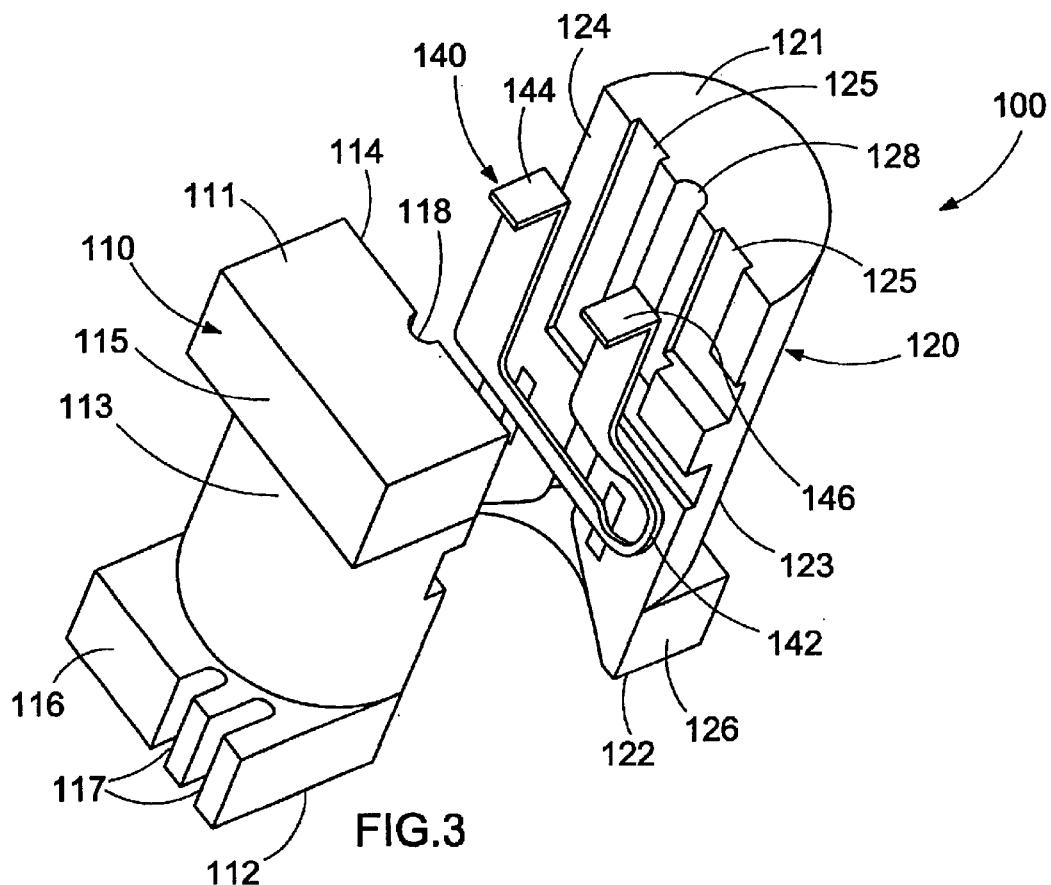
FIG. 3 is an exploded perspective view of the preferred embodiment of the present invention improved spool assembly shown in FIG. 2.
Figure 4:
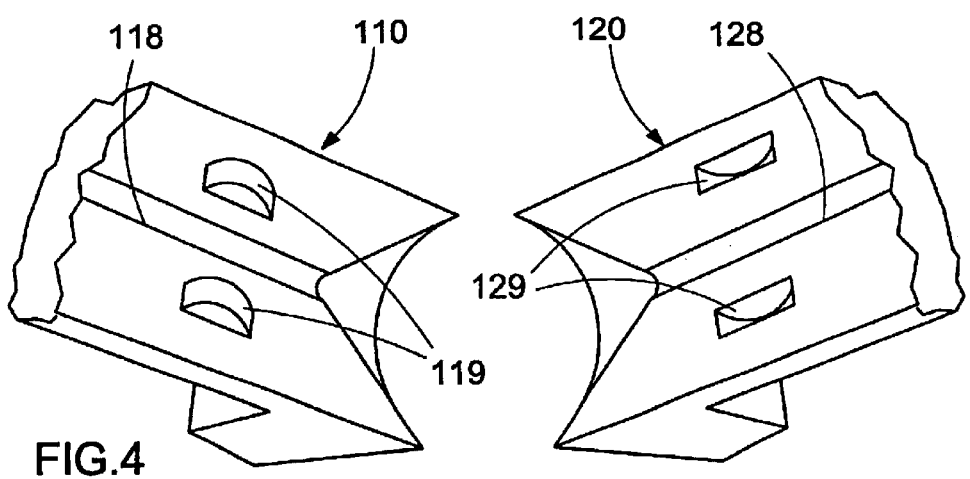
FIG. 4 is a partial exploded perspective view of the preferred embodiment of the present invention improved spool assembly shown in FIG. 3.

Referring to FIGS. 2 through 4, there is shown at 100 one of the preferred embodiments of the present invention improved spool assembly for non-explosive actuators (NEAs) used in electro-mechanical structural separation devices. The basic components of the spool assembly 100 includes two spool halves 110 and 120, a wrap-wire 130 for binding the two spool halves 110 and 120, and an unitary and integral internal member 140.

The two spool halves 110 and 120 each have a generally semi-cylindrical shaped configuration with a top end 111 (121), a bottom end 112 (122), a generally semi-cylindrical external surface 113 (123), and a generally flat internal surface 114 (124). The top and bottom ends 111, 112 (121, 122) of the spool halves 110, 120 may have external flanges 115, 116 (126) for preventing the wrap-wire 130 from slipping off the spool halves 110, 120. One of the flanges (e.g., the bottom flange 116 of spool half 110) may have tie-off notches 117 for fastening the bottom end 132 of the wrap-wire 130. The spool halves 110 and 120 may be made of epoxy plastic material.

The wrap-wire 130 exerts a circumferential stress to the spool halves 110 and 120 to bind them together for retaining an external structural member 102 between the two spool halves 110 and 120. The wrap-wire 130 has a top end 134 which is hooked to a loop of a link-wire 142. The wrap-wire 130 may be made of stainless steel.

The link-wire 142 is an integral portion of the unitary internal member 140. The unitary internal member 140 also have two electrical terminal portions 144 and 146. The unitary internal member 140 is made of electrically conductive material such as stainless steel.

The two electrical terminals 144 and 146 each has a contact surface which are exposed outside of the two spool halves 110, 120 for surface-contact connection with external electrical connectors (not shown) of an electrical current source. When an electric current of a sufficient magnitude is applied to the electrically terminals 144 and 146, the link-wire 142 will be heated. As a result, its tensile strength will be reduced. When the tensile strength of the link-wire 142 is reduced to a magnitude below the tensile stress exerted on the link-wire 142 by the top end 134 of the wrap-wire 130, the link-wire 142 will break, which causes the wrap-wire 130 to be loosened, allowing the two spool halves 110, 120 to separate apart which permits the displacement of an external structural member 102.

One or both of the generally flat internal surfaces 114, 124 of the two spool halves 110, 120 will be provided with recesses 125 that match the configuration of the unitary internal member 140 such that the unitary internal member 140 can be securely held in place between the two spool halves 110, 120 without causing a gap between their generally flat internal surfaces 114, 124.

The generally flat internal surfaces 114, 124 of the two spool halves 110, 120 will also be provided with a central groove 118 (128). When the two spool halves are bound together, these central grooves 118, 128 form a central bore for retaining the external structural member 102.

The generally flat internal surfaces 114, 124 of the two spool halves 110, 120 will further be provided with protruding locators 119 and complementary holes 129 for locking the two spool halves 110, 120 in position which facilitates quick assembling of the two spool halves 110, 120. When the two spool halves 110, 120 are bound together by the wrap-wire 130, the protruding locators 119 are engaged into the complementary holes 129 which also serve the purpose of preventing the two spool halves 110, 120 from both axial and lateral shifting relative to each other.

Referring to FIG. 5, there is shown at 200 another one of the preferred embodiments of the present invention improved spool assembly for NEAs used in electro-mechanical structural separation devices. All aspects of this alternative embodiment 200 are generally similar to those of the embodiment 100 described earlier, except that the terminal portions 244, 246 of the unitary internal member 240 are now configured to be socket receptacles which are to be seated within complementary recesses 214, 216 of spool halve 210 respectively for receiving plug-in electrical connectors of an external electrical current source (not shown).

The present invention improved spool assembly with integrated link-wire and electrical terminals for NEAs used in electro-mechanical structural separation devices has many advantages. It enhances the reliability and durability of repeatable operations of the NEAs.

The present invention improved spool assembly also reduces manufacturing and parts costs of the spool assemblies of the NEAs used in electro-mechanical structural separation devices. It further decreases the time and labor involved in assembling and producing the spool assemblies used for NEAs used in electro-mechanical structural separation devices.

Defined in detail, the present invention is an improved spool assembly for non-explosive actuators used in electro-mechanical structural separation devices, comprising: (a) a first spool half having a generally semi-cylindrical shaped body configuration with a top end, a bottom end, a generally semi-cylindrical shaped external surface and a generally flat internal surface; (b) a second spool half having a generally semi-cylindrical shaped body configuration with a top end, a bottom end, a generally semi-cylindrical shaped external surface and a generally flat internal surface; (c) a unitary and integral internal member made of an electrically conductive material and having a loop shaped link-wire portion and two electrical terminal portions; (d) an external wrap-wire wound around the first and second spool halves and having a connecting end connected to the loop shaped link-wire portion of the unitary and integral internal member such that the wrap-wire tightly binds the first and second spool halves together to form a spool for retaining an external structural member; (e) the internal surface of at least one of the first and second spool halves having recesses that generally match a configuration of the unitary and integral internal member for receiving the unitary and integral internal member such that when the first and second spool halves are bound together by the wrap-wire, the unitary and integral internal member is securely held in place there-between without causing a gap between the internal surfaces of the first and second spool halves; and (f) the two electrical terminal portions of the unitary and integral internal member each having a generally flat contact surface exposed outside of the top ends of the first and second spool halves when the first and second spool halves are bound together by the wrap-wire for providing electrical terminal contact surfaces; (g) whereby when an electrical current of a sufficient magnitude is applied through the contact surfaces of the electrical terminal portions of the unitary and integral internal member, the link-wire portion of the unitary and integral internal member will be heated, which reduces its tensile strength to a magnitude below a tensile stress exerted thereon by the connecting end of the wrap-wire, causing the link-wire portion of the unitary and integral internal member to be broken, which in turn causes the wrap-wire to be loosened, allowing the first and second spool halves to separate apart which permits displacement of the external structural member.

Defined alternatively in detail, the present invention is an improved spool assembly for non-explosive actuators used in electro-mechanical structural separation devices, comprising: (a) a first spool half having a generally semi-cylindrical shaped body configuration with a top end, a bottom end, a generally semi-cylindrical shaped external surface and a generally flat internal surface; (b) a second spool half having a generally semi-cylindrical shaped body configuration with a top end, a bottom end, a generally semi-cylindrical shaped external surface and a generally flat internal surface; (c) a unitary and integral internal member made of an electrically conductive material and having a loop shaped link-wire portion and two electrical terminal portions; (d) an external wrap-wire wound around the first and second spool halves and having a connecting end connected to the loop shaped link-wire portion of the unitary and integral internal member such that the wrap-wire tightly binds the first and second spool halves together to form a spool for retaining an external structural member; (e) the internal surface of at least one of the first and second spool halves having recesses that generally match a configuration of the unitary and integral internal member for receiving the unitary and integral internal member such that when the first and second spool halves are bound together by the wrap-wire, the unitary and integral internal member is securely held in place there-between without causing a gap between the internal surfaces of the first and second spool halves; and (f) the two electrical terminal portions of the unitary and integral internal member each forming a plug-in socket receptacle seated in a respective complementary recess at the top end of one of the first and second spool halves such that the plug-in socket receptacle is accessible from outside of the top ends of the first and second spool halves when the first and second spool halves are bound together by the wrap-wire for providing electrical terminal plug-in sockets; (g) whereby when an electrical current of a sufficient magnitude is applied through the plug-in sockets of the electrical terminal portions of the unitary and integral internal member, the link-wire portion of the unitary and integral internal member will be heated, which reduces its tensile strength to a magnitude below a tensile stress exerted thereon by the connecting end of the wrap-wire, causing the link-wire portion of the unitary and integral internal member to be broken, which in turn causes the wrap-wire to be loosened, allowing the first and second spool halves to separate apart which permits displacement of the external structural member.

Defined broadly, the present invention is an improved spool assembly for non-explosive actuators used in electro-mechanical structural separation devices, comprising: (a) two spool halves each having external surfaces and a generally flat internal surface; (b) a unitary and integral internal member made of an electrically conductive material and having a link-wire portion and two electrical terminal portions; (c) an external wrap-wire wound around the two spool halves and having a connecting end connected to the link-wire portion of the unitary and integral internal member such that the wrap-wire tightly binds the two spool halves together to form a spool for retaining an external structural member; (d) the internal surface of at least one of the two spool halves having recesses that generally match a configuration of the unitary and integral internal member for receiving the unitary and integral internal member such that when the two spool halves are bound together by the wrap-wire, the unitary and integral internal member is securely held in place there-between without causing a gap between the internal surfaces of the two spool halves; and (e) the two electrical terminal portions of the unitary and integral internal member each having a contact end exposed and accessible from outside of the two spool halves when they are bound together by the wrap-wire for providing electrical terminal contacts; (f) whereby when an electrical current of a sufficient magnitude is applied through the electrical terminal contacts, the link-wire portion of the unitary and integral internal member will be heated, which reduces its tensile strength to a magnitude below a tensile stress exerted thereon by the connecting end of the wrap-wire, causing the link-wire portion of the unitary and integral internal member to be broken, which in turn causes the wrap-wire to be loosened, allowing the two spool halves to separate apart which permits displacement of the external structural member.

Defined more broadly, the present invention is an improved spool assembly for non-explosive actuators used in electro-mechanical structural separation devices, comprising: (a) two spool halves each having external surfaces and a generally flat internal surface; (b) a unitary and integral internal member made of an electrically conductive material and having a link-wire portion and two electrical terminal portions; and (c) an external wrap-wire wound around the two spool halves and having a connecting end connected to the link-wire portion of the unitary and integral internal member such that the wrap-wire tightly binds the two spool halves together to form a spool for retaining an external structural member; (d) whereby when an electrical current of a sufficient magnitude is applied through the electrical terminal portions of the unitary and integral internal member, the link-wire portion of the unitary and integral internal member will be heated, which reduces its tensile strength to a magnitude below a tensile stress exerted thereon by the connecting end of the wrap-wire, causing the link-wire portion of the unitary and integral internal member to be broken, which in turn causes the wrap-wire to be loosened, allowing the two spool halves to separate apart which permits displacement of the external structural member.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A spool assembly for non-explosive actuators used in electro-mechanical structural separation devices, comprising:
   a. a first spool half having a generally semi-cylindrical shaped body configuration with a top end, a bottom end, a generally semi-cylindrical shaped external surface and a generally flat internal surface;
   b. a second spool half having a generally semi-cylindrical shaped body configuration with a top end, a bottom end, a generally semi-cylindrical shaped external surface and a generally flat internal surface;
   c. a unitary and integral internal member made of an electrically conductive material and having a loop shaped link-wire portion and two electrical terminal portions;
   d. an external wrap-wire wound around said first and second spool halves and having a connecting end connected to said loop shaped link-wire portion of said unitary and integral internal member such that said wrap-wire tightly binds said first and second spool halves together to form a spool for retaining an external structural member;
   e. said internal surface of at least one of said first and second spool halves having recesses that generally match a configuration of said unitary and integral internal member for receiving said unitary and integral internal member such that when said first and second spool halves are bound together by said wrap-wire, said unitary and integral internal member is securely held in place there-between without causing a gap between said internal surfaces of said first and second spool halves; and
   f. said two electrical terminal portions of said unitary and integral internal member each having a generally flat contact surface exposed outside of said top ends of said first and second spool halves when said first and second spool halves are bound together by said wrap-wire for providing electrical terminal contact surfaces;
   g. whereby when an electrical current of a sufficient magnitude is applied through said contact surfaces of said electrical terminal portions of said unitary and integral internal member, said link-wire portion of said unitary and integral internal member will be heated, which reduces its tensile strength to a magnitude below a tensile stress exerted thereon by said connecting end of said wrap-wire, causing said link-wire portion of said unitary and integral internal member to be broken, which in turn causes said wrap-wire to be loosened, allowing said first and second spool halves to separate apart which permits displacement of said external structural member.

2. The spool assembly in accordance with claim 1, wherein said top and bottom ends of said first and second spool halves have at least one external flange for preventing said wrap-wire from slipping off said first and second spool halves.

3. The spool assembly in accordance with claim 2, wherein said at least one external flange has at least one tie-off notch for fastening an opposite end of said wrap-wire.

4. The spool assembly in accordance with claim 1, wherein said first and second spool halves each has a central groove that forms a central bore when said first and second spool halves are bound together for retaining said external structural member.

5. The spool assembly in accordance with claim 1, wherein said internal surfaces of said first and second spool halves have at least one protruding locator and at least one complementary hole for locking said first and second spool halves in position and preventing relative movement thereof.

6. A spool assembly for non-explosive actuators used in electro-mechanical structural separation devices, comprising:

a. a first spool half having a generally semi-cylindrical shaped body configuration with a top end, a bottom end, a generally semi-cylindrical shaped external surface and a generally flat internal surface;

b. a second spool half having a generally semi-cylindrical shaped body configuration with a top end, a bottom end, a generally semi-cylindrical shaped external surface and a generally flat internal surface;

c. a unitary and integral internal member made of an electrically conductive material and having a loop shaped link-wire portion and two electrical terminal portions;

d. an external wrap-wire wound around said first and second spool halves and having a connecting end connected to said loop shaped link-wire portion of said unitary and integral internal member such that said wrap-wire tightly binds said first and second spool halves together to form a spool for retaining an external structural member;

e. said internal surface of at least one of said first and second spool halves having recesses that generally match a configuration of said unitary and integral internal member for receiving said unitary and integral internal member such that when said first and second spool halves are bound together by said wrap-wire, said unitary and integral internal member is securely held in place there-between without causing a gap between said internal surfaces of said first and second spool halves; and f. said two electrical terminal portions of said unitary and integral internal member each forming a plug-in socket receptacle seated in a respective complementary recess at said top end of one of said first and second spool halves such that said plug-in socket receptacle is accessible from outside of said top ends of said first and second spool halves when said first and second spool halves are bound together by said wrap-wire for providing electrical terminal plug-in sockets;

g. whereby when an electrical current of a sufficient magnitude is applied through said plug-in sockets of said electrical terminal portions of said unitary and integral internal member, said link-wire portion of said unitary and integral internal member will be heated, which reduces its tensile strength to a magnitude below a tensile stress exerted thereon by said connecting end of said wrap-wire, causing said link-wire portion of said unitary and integral internal member to be broken, which in turn causes said wrap-wire to be loosened, allowing said first and second spool halves to separate apart which permits displacement of said external structural member.

7. The spool assembly in accordance with claim 6, wherein said top and bottom ends of said first and second spool halves have at least one external flange for preventing said wrap-wire from slipping off said first and second spool halves.

8. The spool assembly in accordance with claim 7, wherein said at least one external flange has at least one tie-off notch for fastening an opposite end of said wrap-wire.

9. The spool assembly in accordance with claim 6, wherein said first and second spool halves each has a central groove that forms a central bore when said first and second spool halves are bound together for retaining said external structural member.

10. The spool assembly in accordance with claim 6, wherein said internal surfaces of said first and second spool halves have at least one protruding locator and at least one complementary hole for locking said first and second spool halves in position and preventing relative movement thereof.

11. A spool assembly for non-explosive actuators used in electro-mechanical structural separation devices, comprising:

a. two spool halves each having external surfaces and a generally flat internal surface;

b. a unitary and integral internal member made of an electrically conductive material and having a link-wire portion and two electrical terminal portions;

c. an external wrap-wire wound around said two spool halves and having a connecting end connected to said link-wire portion of said unitary and integral internal member such that said wrap-wire tightly binds said two spool halves together to form a spool for retaining an external structural member;

d. said internal surface of at least one of said two spool halves having recesses that generally match a configuration of said unitary and integral internal member for receiving said unitary and integral internal member such that when said two spool halves are bound together by said wrap-wire, said unitary and integral internal member is securely held in place there-between without causing a gap between said internal surfaces of said two spool halves; and e. said two electrical terminal portions of said unitary and integral internal member each having a contact end exposed and accessible from outside of said two spool halves when they are bound together by said wrap-wire for providing electrical terminal contacts;

f. whereby when an electrical current of a sufficient magnitude is applied through said electrical terminal contacts, said link-wire portion of said unitary and integral internal member will be heated, which reduces its tensile strength to a magnitude below a tensile stress exerted thereon by said connecting end of said wrap-wire, causing said link-wire portion of said unitary and integral internal member to be broken, which in turn causes said wrap-wire to be loosened, allowing said two spool halves to separate apart which permits displacement of said external structural member.

12. The spool assembly in accordance with claim 11, wherein said two spool halves have at least one external end flange for preventing said wrap-wire from slipping off said two spool halves.

13. The spool assembly in accordance with claim 12, wherein said at least one external flange has at least one tie-off notch for fastening an opposite end of said wrap-wire.

14. The spool assembly in accordance with claim 11, wherein said two spool halves each has a central groove that forms a central bore when said two spool halves are bound together for retaining said external structural member.

15. The spool assembly in accordance with claim 11, wherein said internal surfaces of said two spool halves have at least one protruding locator and at least one complementary hole for locking said two spool halves in position and preventing relative movement thereof.

16. The spool assembly in accordance with claim 11, wherein said exposed contact end of said electrical terminal portions of said unitary and integral internal member has a generally flat contact surface for providing electrical terminal contact surfaces.

17. The spool assembly in accordance with claim 11, wherein said exposed contact end of said electrical terminal portions of said unitary and integral internal member has a plug-in socket receptacle for providing electrical terminal plug-in sockets.

18. A spool assembly for non-explosive actuators used in electro-mechanical structural separation devices, comprising:

a. two spool halves each having external surfaces and a generally flat internal surface;

b. a unitary and integral internal member made of an electrically conductive material and having a link-wire portion and two electrical terminal portions;

c. said internal surfaces of said two spool halves have recesses which generally match said unitary and integral internal member for receiving said unitary and integral internal member when said two spool halves are bound together by said an external; and d. said external wrap-wire wound around said two spool halves and having a connecting end connected to said link-wire portion of said unitary and integral internal member such that said wrap-wire tightly binds said two spool halves together to form a spool for retaining an external structural member;

e. whereby when an electrical current of a sufficient magnitude is applied through said electrical terminal portions of said unitary and integral internal member, said link-wire portion of said unitary and integral internal member will be heated, which reduces its tensile strength to a magnitude below a tensile stress exerted thereon by said connecting end of said wrap-wire, causing said link-wire portion of said unitary and integral internal member to be broken, which in turn causes said wrap-wire to be loosened, allowing said two spool halves to separate apart which permits displacement of said external structural member.

19. The spool assembly in accordance with claim 18, wherein said two spool halves have at least one external end flange for preventing said wrap-wire from slipping off said two spool halves.

20. The spool assembly in accordance with claim 18, wherein said at least one external flange has at least one tie-off notch for fastening an opposite end of said wrap-wire.

21. The spool assembly in accordance with claim 18, wherein said two spool halves each has a central groove that forms a central bore when said two spool halves are bound together for retaining said external structural member.

22. The spool assembly in accordance with claim 18, wherein said internal surfaces of said two spool halves have at least one protruding locator and at least one complementary hole for locking said two spool halves in position and preventing relative movement thereof.

23. The spool assembly in accordance with claim 18, wherein said two electrical terminal portions of said unitary and integral internal member each has a contact end exposed and accessible from outside of said two spool halves when they are bound together by said wrap-wire.

24. The spool assembly in accordance with claim 23, wherein said exposed contact end of said electrical terminal portions of said unitary and integral internal member has a generally flat contact surface for providing electrical terminal contact surfaces.

25. The spool assembly in accordance with claim 23, wherein said exposed contact end of said electrical terminal portions of said unitary and integral internal member has a plug-in socket receptacle for providing electrical terminal plug-in sockets.

* * * * *